(12) United States Patent
Pienaar

(10) Patent No.: US 9,249,381 B2
(45) Date of Patent: Feb. 2, 2016

(54) PROCESS AND APPARATUS FOR THE REDUCTION OF ALCOHOL IN FERMENTED BEVERAGES

(71) Applicant: Schalk Willem Pienaar, Wellington (ZA)

(72) Inventor: Schalk Willem Pienaar, Wellington (ZA)

( * ) Notice: Subject to any disclaimer, the term of this patent is extended or adjusted under 35 U.S.C. 154(b) by 0 days.

(21) Appl. No.: 14/398,785

(22) PCT Filed: Apr. 10, 2013

(86) PCT No.: PCT/ZA2013/000022
§ 371 (c)(1),
(2) Date: Nov. 4, 2014

(87) PCT Pub. No.: WO2013/177600
PCT Pub. Date: Nov. 28, 2013

(65) Prior Publication Data
US 2015/0132459 A1    May 14, 2015

(30) Foreign Application Priority Data
May 23, 2012 (ZA) .................. 2012/03753

(51) Int. Cl.
*A23L 2/64* (2006.01)
*C12G 3/08* (2006.01)

(52) U.S. Cl.
CPC ...................... *C12G 3/08* (2013.01)

(58) Field of Classification Search
CPC ............ C12G 3/00; C12G 3/08; C12G 3/025; C12G 3/12
USPC ............................ 426/493, 494, 592
See application file for complete search history.

(56) References Cited

U.S. PATENT DOCUMENTS 4,626,437 A    12/1986  Schobinger et al.
4,978,547 A *  12/1990  Petershans ............... B01D 1/26
                                                          159/47.1

FOREIGN PATENT DOCUMENTS

DE    3819527    12/1989
EP    0768373     4/1997
GB    2084607     4/1982

OTHER PUBLICATIONS

International Search Report for International Application No. PCT/ZA2013/000022.

* cited by examiner

*Primary Examiner* — Helen F Heggestad
(74) *Attorney, Agent, or Firm* — Haugen Law Firm PLLP

(57) ABSTRACT

A process is disclosed for reducing alcohol in a fermented beverage without heat damage and without degrading the original flavor profile of the fermented beverage. The process generally includes the steps of: (i) removing aromatics from the wine; (ii) removing alcohol from the wine; (iii) refluxing a portion of the alcohol removed from the wine to increase the alcohol concentration of the alcohol vapor and return at least a portion of the condensed/recovered water to the wine; and (iv) condensing the aromatics removed from the wine and returning at least a portion thereof to the wine.

12 Claims, 1 Drawing Sheet

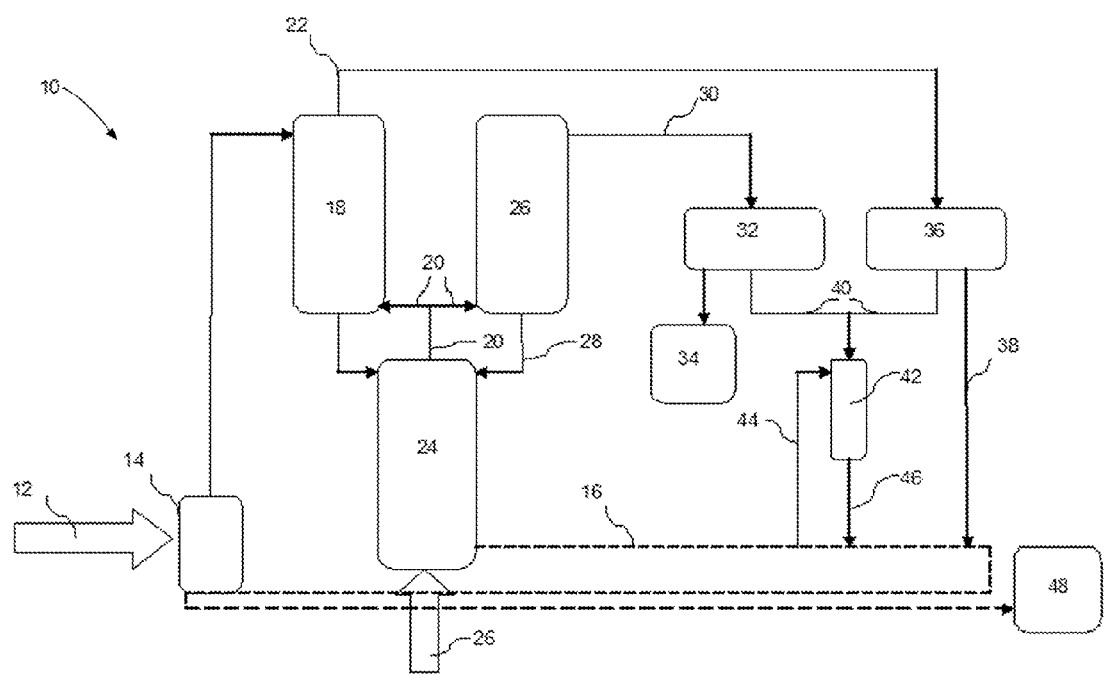

PROCESS AND APPARATUS FOR THE REDUCTION OF ALCOHOL IN FERMENTED BEVERAGES

BACKGROUND

The present invention relates to a process and apparatus for the reduction of alcohol in fermented beverages. More particularly, the present invention relates to a process and apparatus for reducing the alcohol (i.e. ethanol) content of wine.

The challenge when reducing the alcohol content of wine is to:
1. not cause heat damage to the wine;
2. cause minimal water loss from the wine during the alcohol reduction process; and
3. retain in, or return to the wine as much aromatics and flavour components as possible.

In most wine producing countries, it is illegal to dilute wine with water. It is generally not illegal to adjust the taste of wine by removing constituents like acids. Except for a few countries, it is generally not illegal to remove alcohol from wine. It has become standard practice in hot climates, where grapes develop high sugar levels (and therefore, high alcohol content), to practise alcohol reduction techniques on the wine produced.

A variety of processes for removing select component parts from beverages are known. For example, evaporation technology is generally used to remove water from fruit juice and thereby concentrate the fruit juice. However, no feedback loop to re-introduce water evaporated from the feedstock fruit juice back into the evaporation chamber exists, causing the feedstock fruit juice to concentrate, and the operating temperature in the evaporation chamber consequently to rise. Drawbacks of evaporation chambers are that they result in significant water loss from the feedstock juice and their operating temperatures would cause heat damage to a wine feedstock.

Other technologies directed specifically at the removal of alcohol are also known. An example is the membrane processes, which extracts an alcohol-rich permeate stream from wine under pressure. Drawbacks of this process are that: the equipment is expensive; the membranes have a limited lifespan; and the high pressure required makes this process energy intensive. A further example is the spinning cone column used by ConeTech, in which the wine is subjected to low-pressure heating in a column equipped with fast-rotating cones to drive off a portion of the alcohol. A drawback of this process is that, in addition to removing alcohol, many of the flavour components are also removed from the wine and need to be recovered and added back to the wine if the original flavour profile of the wine is to be retained. Another drawback is the inability of the ConeTech technology to concentrate the alcohol stream removed from the wine, resulting in undesirable loss of water from the de-alcoholised wine. A further drawback of the ConeTech technology is that its column includes many internal moving parts rotating at high speed, making the equipment expensive and energy and maintenance intensive.

The process and apparatus according to the present invention aims to address the above drawbacks and challenges.

SUMMARY OF THE INVENTION

According to a first aspect of the present invention there is provided a process for reducing alcohol in a fermented beverage that includes the steps of:

pre-heating a fermented beverage feedstock to a temperature between 40° C. and 60° C.;

introducing the pre-heated fermented beverage feedstock into the upper section of a first distillation column having an operating pressure between 5 kPa and 50 kPa and an operating temperature between 40° C. and 80° C.;

subjecting the fermented beverage feedstock, as it flows down the first distillation column, to alcohol vapour rising up the first distillation column, thereby stripping aromatics from the fermented beverage feedstock to yield an aromatic vapour;

passing the aromatic vapour through a first condenser to condense the aromatics from the aromatic vapour;

discharging the fermented beverage from the first distillation column;

introducing the fermented beverage discharged from the first distillation column into the upper section of a second distillation column having an operating pressure between 5 kPa and 50 kPa and an operating temperature between 45° C. and 85° C.;

subjecting the fermented beverage, as it flows down the second distillation column, to steam rising up the second distillation column, thereby stripping alcohol from the fermented beverage to yield an alcohol vapour;

splitting the alcohol vapour exiting the second distillation column into at least two streams, and feeding: (i) a first stream of alcohol vapour into the bottom section of the first distillation column; and (ii) a second stream of alcohol vapour into a rectifier;

refluxing the second stream of alcohol vapour in the rectifier to increase its alcohol concentration;

passing the refluxed alcohol vapour exiting the rectifier through a second condenser to condense the alcohol from the alcohol vapour;

returning at least a portion of the liquid condensed in the rectifier into the upper section of the second distillation column; and discharging the fermented beverage from the second distillation column and returning at least a portion of the condensed aromatics thereto.

The process may include the step of subjecting at least a portion of the aromatics exiting the first condenser to a membrane separation process to remove a portion of the alcohol therefrom. And, at least a portion of the aromatics that has passed through the membrane separation process may be returned to the fermented beverage discharged from the second distillation column.

Typically, the steam rising up the second distillation column is a low concentration alcohol vapour between 1% and 50% ABV.

Preferably, the process includes the step of passing the vapours exiting the first and/or second condensers through a scrubber column. More preferably, at least a portion of the fermented beverage that has been discharged from the second distillation column is fed through the scrubber column to absorb aromatics from the vapours.

Typically, at least a portion of the fermented beverage with absorbed aromatics exiting the scrubber column is returned to the fermented beverage discharged from the second distillation column.

Generally, the fermented beverage is wine.

Preferably, the wine discharged from the second distillation column has an alcohol concentration greater than 1% alcohol-by-volume (ABV). More preferably, the wine discharged from the second distillation column has an alcohol concentration greater than 0.5% ABV.

Typically, the wine discharged from the second distillation column with aromatics re-introduced is mixed with fermented beverage feedstock and stored in a tank, packaged or bottled for human consumption.

According to a second aspect of the present invention there is provided apparatus for reducing alcohol in a fermented beverage using the process described above.

BRIEF DESCRIPTION OF THE DRAWINGS

A preferred embodiment of the invention will now be described in more detail, by way of example only, with reference to the accompanying drawing in which:

FIG. 1 is a schematic diagram of a plant operating the process according to a preferred embodiment of the invention.

In this specification, "alcohol vapour" means vapour that includes both alcohol and water components. The term is not limited to pure alcohol vapour. Furthermore, all pressures mentioned in this specification are "absolute pressures".

DESCRIPTION OF THE INVENTION

With reference to the FIG. 1, a process for reducing alcohol in a fermented beverage 10, such as wine, according to a preferred embodiment of the invention includes the steps of: (i) removing aromatics from the wine; (ii) removing alcohol from the wine; (iii) refluxing a portion of the alcohol removed from the wine to increase the alcohol concentration of the alcohol vapour and return at least a portion of the condensed/recovered water to the wine; and (iv) condensing the aromatics removed from the wine and returning at least a portion thereof to the wine.

The process 10 starts by passing wine feedstock 12 through a pre-heater 14 to pre-heat the wine feedstock 12 to a temperature between 40° C. and 60° C. The pre-heater 14 transfers heat from de-alcoholised wine 16 that has previously passed through the process 10.

The pre-heated wine feedstock 12 is then introduced into a first distillation column 18 through an inlet at or near the top of the column and permitted to flow under gravity to the bottom of the column 18. At or near the bottom of the first distillation column 18 is an inlet for alcohol vapour 20 to enter and rise up the column 18 to a vapour outlet near the top of the column 18. The counter-flow of the wine feedstock 12 travelling down the column 18 and the alcohol vapour 20 rising up the column 18 causes aromatics (together with a small amount of alcohol and water) to be stripped from the wine feedstock 12 to yield an aromatic vapour 22. The degree of stripping of aromatics from the wine feedstock 12 is determined by the rate of flow of alcohol vapour 20 through the first distillation column 18, as controlled by a valve (not shown) in either the alcohol vapour inlet or the vapour outlet. The interior of the first distillation column 18 typically includes random or structured packing or trays (not shown) to encourage aromatic stripping of the wine feedstock 12 by the alcohol vapour 20.

To prevent heat damage to the wine 12, the first distillation column 18 operates at a pressure between 5 kPa and 50 kPa and a temperature between 40° C. and 80° C.—the temperature being dependent on the pressure in the first distillation column.

The de-aromatized wine collected at the bottom of the first distillation column 18 is discharged from the column 18 and introduced into a second distillation column 24 through an inlet at or near the top of the second distillation column 24 and permitted to flow under gravity to the bottom of the column 24. At or near the bottom of the second distillation column 24 is an inlet for low pressure steam or low concentration alcohol vapour (i.e. between 1% and 50% alcohol-by-volume (ABV)) 26 to enter and rise up the column 24 to a vapour outlet near the top of the column 24. The counter-flow of the de-aromatized wine 12 travelling down the column 24 and the steam/low-concentration alcohol vapour 26 rising up the column 24 causes alcohol (together with some water and residual aromatics) to be stripped from the de-aromatized wine 12 to yield an alcohol vapour stream 20 having an alcohol concentration typically between 40% to 70% ABV (dependent on the alcohol concentration of the wine feedstock 12). The degree of stripping of alcohol from the de-aromatized wine 12 is determined by the rate of flow of steam/low-concentration alcohol vapour 26 through the second distillation column 24. The steam/low-concentration alcohol vapour 26 is generated by partial vaporisation of a portion of the de-alcoholised wine 16 in the base of the second distillation column 24. This enables the production of wine with a varying degree of alcohol depletion exiting the bottom of the second distillation column 24. The interior of the second distillation column 24 typically includes random or structured packing or trays (not shown) to encourage alcohol stripping of the de-aromatized wine 12 by the steam/low concentration alcohol vapour 26.

To prevent heat damage to the wine 12, the second distillation column 24 operates at a pressure between 5 kPa and 50 kPa and a temperature between 45° C. and 85° C.

The alcohol vapour 20 exiting the second distillation column 24 is split into two streams. A first stream 20 is fed into the first distillation column 18 via the alcohol vapour inlet and a second stream 20 is fed into a rectifier 26. While in the rectifier 26, the second stream of alcohol vapour 20 encounters refluxed alcohol liquid, continually condensing and evaporating until the alcohol concentration of the alcohol vapour 20 within the rectifier 26 reaches typically 80% to 95% ABV. The reflux process increases the alcohol content of the alcohol vapour 20 by condensing water therefrom. This water 28 (with an alcohol component) is collected at the bottom of the rectifier 26 and returned to the top of the second distillation column 24. In so doing, the water 28 condensed from the alcohol vapour 20 in the rectifier 26 is returned to the de-aromatized wine 12 in the second distillation column 24.

The alcohol vapour 30 exiting the rectifier 26 is passed through a second condenser 32 that uses a cold utility, cooling water, chilled water, or glycol to condense the alcohol therefrom, which is stored in a tank 34.

De-alcoholised wine 16 discharged from the second distillation column 24 has an alcohol concentration greater than 1% ABV or, in some instances, 0.5% ABV. This de-alcoholised wine 16 is returned to the pre-heater 14 to transfer heat to wine feedstock 12 and thereby reduce the temperature of the de-alcoholised wine 16 to between 20° C. and 40° C., depending on the temperature of the wine feedstock 12.

The aromatic vapour 22 exiting the first distillation chamber 18 is passed through a first condenser 36 (which typically operates at a temperature 1 to 5° C. higher than that of the second condenser 32) to condense the aromatics from the aromatic vapour 22, which condensed aromatics 38 (or a portion thereof) are then returned to the de-alcoholised wine 16.

The vapour 40 exiting the first and second condensers 32 and 36 is then passed through a scrubber column 42 that is fed 44 by at least a portion of the de-alcoholised wine 16 to absorb residual aromatics from the vapour 40.

At least a portion of the wine (with absorbed aromatics) 46 exiting the scrubber column 42 is then returned to the de-alcoholised wine 16.

Optionally, at least a portion of the condensed aromatics 38 exiting the first condenser 36 may be subjected to a membrane separation process to remove a portion of the alcohol therefrom. And, at least a portion of the condensed aromatics 38 that has passed through the membrane separation process may be returned to the fermented beverage discharged from the second distillation column 24.

By returning water 28 to the de-aromatized wine in the second distillation column 24 and aromatics 38 and 46 to the de-alcoholised wine 16, the de-alcoholised wine 16 retains many of its flavour components despite having its alcohol content reduced.

The de-alcoholised wine 16 with aromatics 38 and 46 re-introduced is then mixed with wine feedstock 12 (that has not been pre-heated) and stored in a tank 48, packaged or bottled for ultimate human consumption. For example, mixing 25% de-alcoholised wine 16 having an alcohol concentration of 1% ABV with 75% wine feedstock 12 having an alcohol concentration of 16% ABV yields a wine with an alcohol concentration of 14.5% ABV.

The process 10 is a single, continuous process using distillation columns 18 and 24 having no internal moving parts.

A second aspect of the invention relates to apparatus used in the process 10 described above.

It will be appreciated that, although the process 10 has been described using wine as a feedstock 12, any other fermented beverage can be used as a feedstock.

It will also be appreciated that the flow of wine 12 and 16 during the process 10 can be caused by pumps or gravity employing a double-lock (air-lock type) arrangement to enable draining against the force of the operating vacuum in the distillation columns 18 and 24 and rectifier 26.

The invention claimed is:

1. A process for reducing alcohol in a fermented beverage including the steps of:
   pre-heating a fermented beverage feedstock to a temperature between 40° C. and 60° C.;
   introducing the pre-heated fermented beverage feedstock into the upper section of a first distillation column having an operating pressure between 5 kPa and 50 kPa and an operating temperature between 40° C. and 80° C.;
   subjecting the fermented beverage feedstock, as it flows down the first distillation column, to alcohol vapour rising up the first distillation column, thereby stripping aromatics from the fermented beverage feedstock to yield an aromatic vapour;
   passing the aromatic vapour through a first condenser to condense the aromatics from the aromatic vapour;
   discharging the fermented beverage from the first distillation column;
   introducing the fermented beverage discharged from the first distillation column into the upper section of a second distillation column having an operating pressure between 5 kPa and 50 kPa and an operating temperature between 45° C. and 85° C.;
   subjecting the fermented beverage, as it flows down the second distillation column, to steam rising up the second distillation column, thereby stripping alcohol from the fermented beverage to yield an alcohol vapour;
   splitting the alcohol vapour exiting the second distillation column into at least two streams, and feeding: (i) a first stream of alcohol vapour into the bottom section of the first distillation column; and (ii) a second stream of alcohol vapour into a rectifier;
   refluxing the second stream of alcohol vapour in the rectifier to increase its alcohol concentration;
   passing the refluxed alcohol vapour exiting the rectifier through a second condenser to condense the alcohol from the alcohol vapour;
   returning at least a portion of the liquid condensed in the rectifier into the upper section of the second distillation column; and
   discharging the fermented beverage from the second distillation column and returning at least a portion of the condensed aromatics thereto.

2. A process for reducing alcohol in a fermented beverage according to claim 1, further including the step of subjecting at least a portion of the aromatics exiting the first condenser to a membrane separation process to remove a portion of the alcohol therefrom.

3. A process for reducing alcohol in a fermented beverage according to claim 2 further including the step of returning at least a portion of the aromatics that has passed through the membrane separation process to the fermented beverage discharged from the second distillation column.

4. A process for reducing alcohol in a fermented beverage according to claim 1, wherein the steam rising up the second distillation column is a low concentration alcohol vapour.

5. A process for reducing alcohol in a fermented beverage according to claim 4, wherein the low concentration alcohol vapour is between 1% and 50% ABV.

6. A process for reducing alcohol in a fermented beverage according to claim 5 further including the step of passing the vapours exiting the first and/or second condensers through a scrubber column.

7. A process for reducing alcohol in a fermented beverage according to claim 6 further including the step of feeding at least a portion of the fermented beverage that has been discharged from the second distillation column through the scrubber column to absorb aromatics from the vapours.

8. A process for reducing alcohol in a fermented beverage according to claim 7 further including the step of returning at least a portion of the fermented beverage with absorbed aromatics exiting the scrubber column to the fermented beverage discharged from the second distillation column.

9. A process for reducing alcohol in a fermented beverage according to claim 8, wherein the fermented beverage is wine.

10. A process for reducing alcohol in a fermented beverage according to claim 9, wherein the alcohol concentration in the wine discharged from the second distillation column is greater than 1% alcohol-by-volume.

11. A process for reducing alcohol in a fermented beverage according to claim 10, wherein the alcohol concentration in the wine discharged from the second distillation column is greater than 0.5% alcohol-by-volume.

12. A process for reducing alcohol in a fermented beverage according to claim 9, wherein the process includes the further step of mixing wine discharged from the second distillation column with aromatics re-introduced with fermented beverage feedstock.

* * * * *